United States Patent
Wang et al.

(10) Patent No.: US 9,142,955 B2
(45) Date of Patent: Sep. 22, 2015

(54) METHOD AND SYSTEM FOR FAULT PROTECTION

(71) Applicant: GM Global Technology Operations LLC, Detroit, MI (US)

(72) Inventors: Kon-King M. Wang, Canton, MI (US); William T. Ivan, Shelby Township, MI (US); Bryan M. Ludwig, West Bloomfield, MI (US); Kris S. Sevel, Rochester Hills, MI (US)

(73) Assignee: GM GLOBAL TECHNOLOGY OPERATIONS LLS, Detroit, MI (US)

( * ) Notice: Subject to any disclaimer, the term of this patent is extended or adjusted under 35 U.S.C. 154(b) by 512 days.

(21) Appl. No.: 13/665,809

(22) Filed: Oct. 31, 2012

(65) Prior Publication Data

US 2014/0118868 A1    May 1, 2014

(51) Int. Cl.
*H02H 9/08* (2006.01)
*H02P 27/06* (2006.01)
*B60K 6/00* (2007.10)
*H02M 1/32* (2007.01)

(52) U.S. Cl.
CPC .. *H02H 9/08* (2013.01); *B60K 6/00* (2013.01); *H02M 1/32* (2013.01); *H02P 27/06* (2013.01); *Y02T 10/62* (2013.01)

(58) Field of Classification Search
USPC .......................................................... 361/42
See application file for complete search history.

(56) References Cited

U.S. PATENT DOCUMENTS

| | | | | |
|---|---|---|---|---|
| 5,666,255 | A * | 9/1997 | Muelleman | 361/111 |
| 7,612,576 | B1 * | 11/2009 | Heller et al. | 324/765.01 |
| 8,542,467 | B2 * | 9/2013 | Yamaguchi | 361/18 |
| 2003/0155928 | A1 * | 8/2003 | Roden et al. | 324/509 |
| 2005/0218830 | A1 * | 10/2005 | Yadlapalli | 315/224 |
| 2010/0207634 | A1 * | 8/2010 | Wang | 324/509 |
| 2011/0181993 | A1 * | 7/2011 | Yamaguchi | 361/111 |
| 2011/0218745 | A1 * | 9/2011 | Hasan et al. | 702/58 |
| 2014/0118868 | A1 * | 5/2014 | Wang et al. | 361/42 |
| 2014/0132278 | A1 * | 5/2014 | Tang et al. | 324/509 |

* cited by examiner

*Primary Examiner* — Ronald W Leja
(74) *Attorney, Agent, or Firm* — Ingrassis Fisher & Lorenz, P.C.

(57) ABSTRACT

Systems and methods for a fault protection are provided that can be implemented in a hybrid electric vehicle (HEV) to limit the magnitude of a current that flows when an AC-to-chassis fault (ACF) occurs between an AC connection and the chassis of the HEV. An electric machine having a winding, an inverter sub-module (ISM) having a first switch and a second switch, and fault protection elements (FPEs), coupled to the ISM, are provided. The winding is coupled to the ISM coupled via the AC connection. The FPEs can include, for example, first and second inductances. To limit the magnitude of the current, the current can be passed along a first current path that includes the second inductance when the first switch is closed, and can be passed along a second current path that includes the first inductance when the second switch is closed.

20 Claims, 4 Drawing Sheets

METHOD AND SYSTEM FOR FAULT PROTECTION

TECHNICAL FIELD

Embodiments of the present invention generally relate to machine drive systems, and more particularly relate to protecting an inverter module of a machine drive system when an AC-to-chassis fault occurs.

BACKGROUND

Electric multi-phase machines are utilized in a wide variety of applications. As used herein, the term "multi-phase" refers to three or more phases, and can be used to refer to electric machines that have three or more phases.

For example, many hybrid/electric vehicles (HEVs) include a machine drive system (sometimes also referred to as an electric traction drive system) that includes as alternating current (AC) electric machine that is driven by an inverter module. The inverter module is supplied with power from a direct current (DC) power source, such as a storage battery. An AC cable can be used to couple terminals at the windings of the AC electric machine to corresponding terminals at the inverter sub-modules of the inverter module. Each inverter sub-module includes a pair of switches. Switching signals are applied to each pair of switches in a complementary manner to convert the DC power to AC power that drives the AC electric machine, which in turn drives a shaft of HEV's drivetrain.

In some situations, an AC-to-chassis fault can occur at a motor winding of the electric machine (or the terminal it is connected to), at the inverter sub-module (or the terminal it is connected to or in one of the elements of an inverter sub-module), or at any point along the AC cable that couples the terminals of the machine to terminals of the inverter module.

It would be desirable to provide circuitry that can help protect the inverter module from high magnitude of fault currents that flow when an AC-to-chassis fault happens. Other desirable features and characteristics of the present invention will become apparent from the subsequent detailed description and the appended claims, taken in conjunction with the accompanying drawings and the foregoing technical field and background.

SUMMARY

Embodiments of the present invention relate to methods and systems for limiting the magnitude of a current that flows when an AC-to-chassis fault occurs between an AC connection and a ground node (e.g., chassis of a HEV).

In accordance with some of the disclosed embodiments, a fault protection method is provided for limiting the magnitude of a current that flows when an AC-to-chassis fault occurs between an AC connection and a chassis of a hybrid electric vehicle (HEV). The HEV includes an electric machine comprising a winding, an inverter sub-module, and first and second inductances, coupled to the inverter sub-module. The electric machine includes a winding that is coupled to the inverter sub-module coupled to the winding via an AC connection. The inverter sub-module comprises a first switch and a second switch. In accordance with the method, during the AC-to-chassis fault, when the first switch is closed, the current generated during the AC-to-chassis fault is passed along a first current path from the chassis through the second inductance to limit the magnitude of the current, and when the second switch is closed, the current generated during the AC-to-chassis fault is passed along a second current path from the chassis through the first inductance to limit the magnitude of the current.

In accordance with some of the disclosed embodiments, a system is provided that includes a ground node that is at ground potential, an inverter module, a first current path, a second current path, and fault protection elements. The inverter module includes an inverter sub-module coupled to an AC connection. The first current path extends from the ground node over the AC connection through the inverter sub-module, and the second current path also extends from the ground node over the AC connection through the inverter sub-module. The fault protection elements are coupled to the inverter sub-module, and are configured to provide inductive impedance that limits the magnitude of a current that flows through either the first current path or the second current path when an AC-to-ground fault occurs between the AC connection and the ground node.

In one embodiment, the fault protection elements may comprise a first inductance and a second inductance. In some embodiments, the system can also include an electric machine and the inverter sub-module is coupled to a winding of the electric machine via the AC connection. The inverter sub-module can include a first switch and a second switch. During an AC-to-ground fault, when the first switch is closed, the current flows along the first current path, which is from the ground node through the second inductance, the inverter sub-module, the first switch, the winding, and back to the ground node, and the second inductance provides inductive impedance that limits the magnitude of the current generated during the AC-to-ground fault. By contrast, during an AC-to-ground fault, when the second switch is closed, the current flows along the second current path, which is from the ground node through the winding, the inverter sub-module, the first inductance and back to the ground node, such that the first inductance provides inductive impedance that limits the magnitude of the current generated during the AC-to-ground fault.

In one embodiment, a hybrid electric vehicle is provided that has a chassis that is at ground potential, an electric machine comprising a winding, an inverter module comprising: an inverter sub-module coupled to the winding via an AC connection, and fault protection elements coupled to the inverter sub-module. When an AC-to-chassis fault occurs between the AC connection and the chassis, the fault protection elements are configured to provide inductive impedance that limits the magnitude of a current that flows through either a first current path or a second current path. In one embodiment, the fault protection elements can include a first inductance along the second current path, and a second inductance along the first current path.

In one embodiment, the hybrid electric vehicle can also include a first Y-capacitor, and a second Y-capacitor coupled electrically in series with the first Y-capacitor. In such embodiments, the fault protection elements can be coupled between the inverter sub-module, the first Y-capacitor, and the second Y-capacitor. The first Y-capacitor and the second Y-capacitor can suppress EMI noise due to switching of the first and second switches.

In one embodiment, the inverter module can also include an X-capacitor coupled electrically in parallel with the inverter sub-module, and the fault protection elements can include the first inductance coupled between the X-capacitor and the first Y-capacitor, and the second inductance coupled between the X-capacitor and the second Y-capacitor. In one implementation, the inverter module also includes a bulk capacitor coupled electrically in parallel with the inverter sub-module and the X-capacitor.

In one embodiment, the hybrid electric vehicle can also include a high-voltage bus, a voltage source having a positive terminal and a negative terminal coupled to the high-voltage bus, a first isolation resistor that is coupled to the positive terminal and electrically in parallel with the first Y-capacitor, and a second isolation resistor that is coupled to the negative terminal and electrically in parallel with the second Y-capacitor. The first Y-capacitor and the first isolation resistor can be coupled between the chassis and a node that is shared between the positive terminal of the voltage source and the first inductance, and the second Y-capacitor and the second isolation resistor can be coupled between the chassis and another node that is shared between the negative terminal of the voltage source and the second inductance.

In one embodiment, the inverter sub-module comprises a first switch and a second switch.

When the first switch is closed and an AC-to-chassis fault occurs between the AC connection and the chassis, the current flows along the first current path. In one implementation, the first current path can be, for example, from the chassis through the second inductance, the inverter sub-module, the first switch, the winding, and back to the chassis. When the first switch is closed, the second inductance provides inductive impedance that limits the magnitude of the current generated during the AC-to-chassis fault at high frequencies and the second isolation resistor provides another impedance that limits the magnitude of the current generated during the AC-to-chassis fault at low frequencies.

By contrast, when the second switch is closed and an AC-to-chassis fault occurs between the AC connection and the chassis, the current flows along the second current path. In one implementation, the second current path can be, for example, from the chassis through the winding, the inverter sub-module, the first inductance and back to the chassis. When second switch is closed, the first inductance provides inductive impedance that limits the magnitude of the current generated during the AC-to-chassis fault at high frequencies, and the first isolation resistor provides another impedance that limits the magnitude of the current generated during the AC-to-chassis fault at low frequencies.

DESCRIPTION OF THE DRAWINGS

Embodiments of the present invention will hereinafter be described in conjunction with the following drawing figures, wherein like numerals denote like elements.

DETAILED DESCRIPTION

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary or the following detailed description.

Embodiments of the present invention relate to systems and apparatus for sustaining an AC-to-chassis fault in a three-phase system drive system and can be implemented in operating environments such as a hybrid/electric vehicle (HEV). In the exemplary implementations which will now be described, the control techniques and technologies will be described as applied to a hybrid/electric vehicle. However, it will be appreciated by those skilled in the art that the same or similar techniques and technologies can be applied in the context of other systems in which it is desirable to control operation of a multi-phase system.

Figure 1:
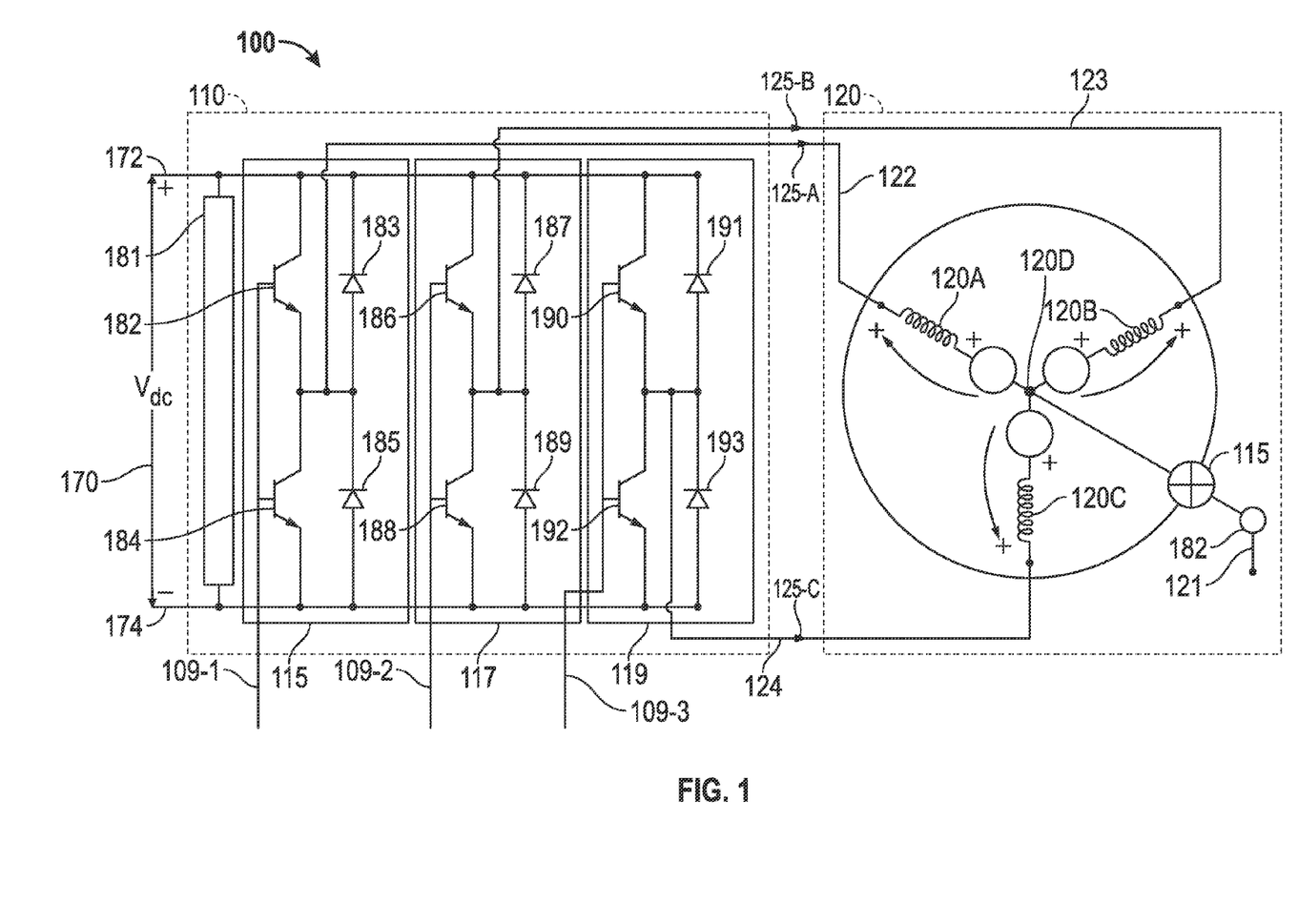
FIG. 1 is a block diagram of one example of a machine drive system in accordance with the disclosed embodiments.

FIG. 1 is a block diagram of one example of a machine drive system 100 in accordance with the disclosed embodiments. In one particular implementation, the machine drive system 100 can be implemented in an HEV. Further, it is noted that although the machine drive system 100 will be described as having three-phases, that the disclosed embodiments are not limited to machine drive systems having three phases and that the disclosed embodiments are applicable to machine drive systems having any number of phases. As such, it will be appreciated that the disclosed embodiments are not limited to a three-phase system, and in other embodiments, the AC machine 120 that is described below can have other numbers of phases, and that the disclosed embodiments can be applied to any type of multi-phase AC machine that includes fewer or more phases. Furthermore, it is noted that in the following description of one particular non-limiting implementation, the AC machine 120 is described as a three-phase, permanent magnet AC machine. In one particular implementation, the electric machine 120 comprises a three-phase, permanent-magnet synchronous machine (PMSM) 120. However, it should be appreciated that the illustrated embodiment is only one non-limiting example of the types of AC machines that the disclosed embodiments can be applied to.

In the embodiment illustrated in FIG. 1, a three-phase AC machine 120 is controlled via a three-phase pulse width modulated (PWM) inverter module 110 that is coupled to the three-phase AC machine 120. The three-phase AC machine 120 can efficiently use a DC input voltage (Vdc) source 170 provided to the three-phase inverter module 110 by adjusting current commands that control the three-phase AC machine 120.

As illustrated in FIG. 1, the three-phase AC machine 120 has three stator or machine windings 120A, 120B, 120C, connected to machine terminals A, B, C, and the three-phase inverter module 110 includes three inverter sub-modules 115, 117, and 119. In this particular embodiment, in phase A the inverter sub-module 115 is coupled to machine winding 120A, in phase B the inverter sub-module 117 is coupled to machine winding 120B, and in phase C the inverter sub-module 119 is coupled to machine winding 120C. The machine windings A, B, C (120A, 120B, 120C) are coupled together at a neutral point (N) 120D. The current into machine winding A 120A flows out machine windings B, C 120B-120C, the current into machine winding B 120B flows out machine windings A and C, 120A, 120C, and the current into machine winding C 120C flows out machine windings A and B, 120A, 120B.

The resultant phase or stator currents (Ia-Ic) 122, 123, 124, flow through respective stator windings 120A-c. The phase to neutral voltages across each of the stator windings 120A-120C are respectively designated as Van, Vbn, Vcn, with the back electromotive force (EMF) voltages generated in each of the stator windings 120A-120C respectively shown as the voltages Ea, Eb, Ec, each respectively shown electrically connected in series with stator windings 120A-120C. As is well known, these back EMF voltages Ea, Eb, Ec, are the voltages induced in the respective stator windings 120A-120C by the rotation of the permanent magnet rotor. As will be described below, the three-phase AC machine 120 generates mechanical power (Torque×Speed) based on three-phase current signals received from the inverter module 110. Although not illustrated in FIG. 1, in some implementations, the machine 120 can include a gear coupled to and driven by a shaft of the three-phase AC machine 120.

The inverter 110 includes a first inverter sub-module 115 comprising a dual switch 182/183, 184/185, a second inverter sub-module 117 comprising a dual switch 186/187, 188/189, and a third inverter sub-module 119 comprising a dual switch 190/191, 192/193. As such, inverter 110 has six solid state controllable switching devices 182, 184, 186, 188, 190, 192, and six diodes 183, 185, 187, 189, 191, 193, to appropriately switch the DC input voltage (Vdc) source 170 and provide three-phase energization of the stator windings 120A, 120B, 120C of the three-phase AC machine 120. During normal operating conditions, switching of solid state switching devices 182, 184, 186, 188, 190, 192 within the inverter sub-modules 115, 117, 119 is controlled by providing appropriate control signals to the individual inverter sub-modules 115, 117, 119, thereby controlling the outputs of the inverter sub-modules 115, 117, 119 that are provided to machine windings 120A-120C, respectively. The resultant stator currents (Ia . . . Ic) 122-124 that are generated by the inverter sub-modules 115, 117, 119 of the three-phase inverter module 110 are provided to machine windings 120A, 120B, 120C. The voltages as Van, Vbn, Vcn, and the voltage at node N fluctuate over time depending on the open/close states of switches 182, 184, 186, 188, 190, 192 in the inverter sub-modules 115, 117, 119 of the inverter module 110. The back electromotive force (EMF) voltages Ea, Eb, Ec are not influenced by the inverter switching, but only motor speed.

Although not illustrated, each inverter sub-module can also include other circuit elements such as capacitors as will be described below with reference to FIGS. 2-4.

In addition, the three-phase inverter module 110 is coupled to the PWM module (not illustrated) that is used for the control of pulse width modulation (PWM) of the phase voltage command signals. Switching vector signals 109 are generated at the PWM module (not illustrated) and provided to the three-phase inverter module 110, and used to control the switching states of switches in PWM inverter 110 and generate three-phase voltage commands (alternating current (AC) waveforms) that drive each phase A, B, C of the three-phase AC powered machine 120. The switching states of switches in inverter module 110 are controlled such that at no time are both switches in the same inverter sub-module 115-117 or "leg" are turned on to prevent the DC supply from being shorted. As such, the switches in the same inverter sub-module 115-117 are operated in a complementary manner (during normal operation) such that when one is off the other is on and vice versa. Thus, in a given phase (A . . . C) at any particular time, one of the switches is off and the other one of the switches is on (i.e., the two switches in a particular inverter sub-module have opposite on/off states).

The three-phase inverter module 110 receives the DC input voltage (Vdc) 170 and switching vector signals 109, and uses them to generate three-phase alternating current (AC) voltage signal waveforms at inverter poles that drive the three-phase AC machine 120 at varying angular velocities ($\omega r$). The three-phase machine 120 receives the three-phase voltage signals generated by the PWM inverter 110 and generates a machine output at a commanded torque.

Each inverter sub-module 115, 117, 119 is coupled to one of machine windings 120A-120C, respectively, via a corresponding AC connection 125A-125C. Typically the AC connections (e.g., wires) are housed together in an AC cable (not illustrated). In such implementations, the AC cable includes one AC connection 125 (e.g., wire) for each phase, where each AC connection 125 connects a terminal (not illustrated) of a particular inverter sub-module of the inverter 110 to a corresponding terminal of a particular winding 120 of the machine 120. For instance, in the exemplary three-phase system that is illustrated in FIG. 1, an AC cable that couples the three-phase machine 120 to the three-phase inverter module 110 has three AC connections 125-A, 125-B, 125-C.

AC-to-Chassis Fault

An AC-to-chassis fault refers to a fault at any point between the AC cable and the chassis of the HEV. For example, an AC-to-chassis fault can occur at a motor winding (or the terminal it is connected to), at an inverter sub-module (or the terminal it is connected to or in one of the elements of the inverter sub-module), or at any point along the AC cable (or one of its AC connections). Examples of an AC-to-chassis fault can include situations when the AC cable is damaged, or when there is a bad connection at a terminal, or when there is a fault between a winding and the chassis, etc.

In accordance with the disclosed embodiments, when an AC-to-chassis fault occurs between an AC connection and the chassis of an HEV, fault protection elements are provided that are configured to provide inductive impedance that limits the magnitude of a fault current that is generated as a result of the AC-to-chassis fault. The disclosed embodiments allow the inverter module 110 of the machine drive system 100 to sustain operation when an AC-to-chassis fault occurs. The disclosed embodiments can prevent hardware damage that might otherwise be caused due to high magnitude of resonant fault currents circulating on a faulted path during an AC-to-chassis fault. In HEV applications this can also prevent the HEV from shutting down while operating including when the HEV is moving.

Fault Protection

Figure 2:
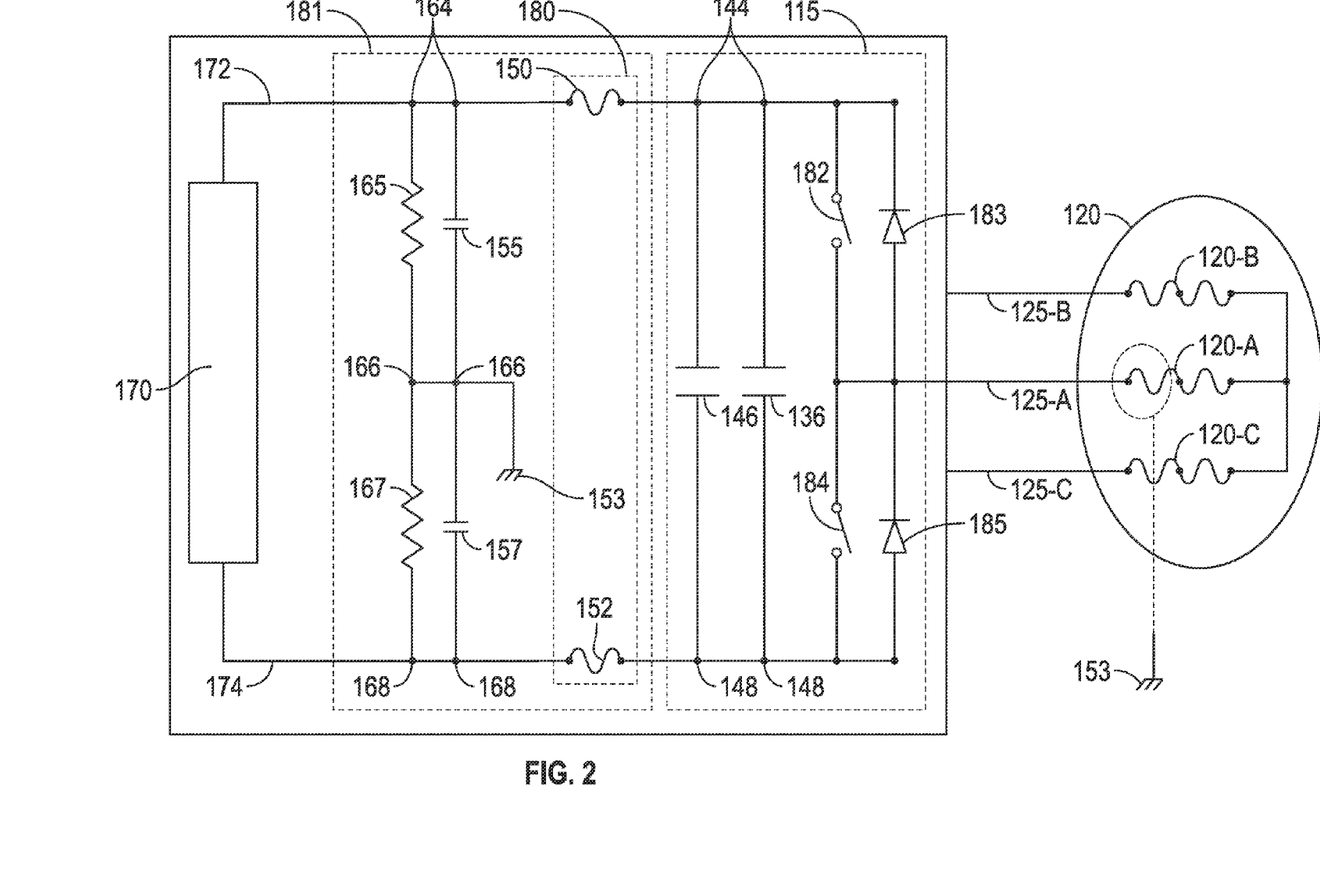
FIG. 2 is a block diagram of a portion of the machine drive system of FIG. 1 in accordance with some of the disclosed embodiments.

FIG. 2 is a block diagram of a portion of the machine drive system 100 of FIG. 1 that includes an exemplary implementation of circuitry 181 that includes fault protection elements 180 in accordance with some of the disclosed embodiments. FIGS. 3 and 4 are block diagrams that illustrate the operation of the portion of the machine drive system 100 of FIG. 2 during different AC-to-chassis fault scenarios. FIGS. 2-4 will be referenced together in the description that follows.

Figure 3:
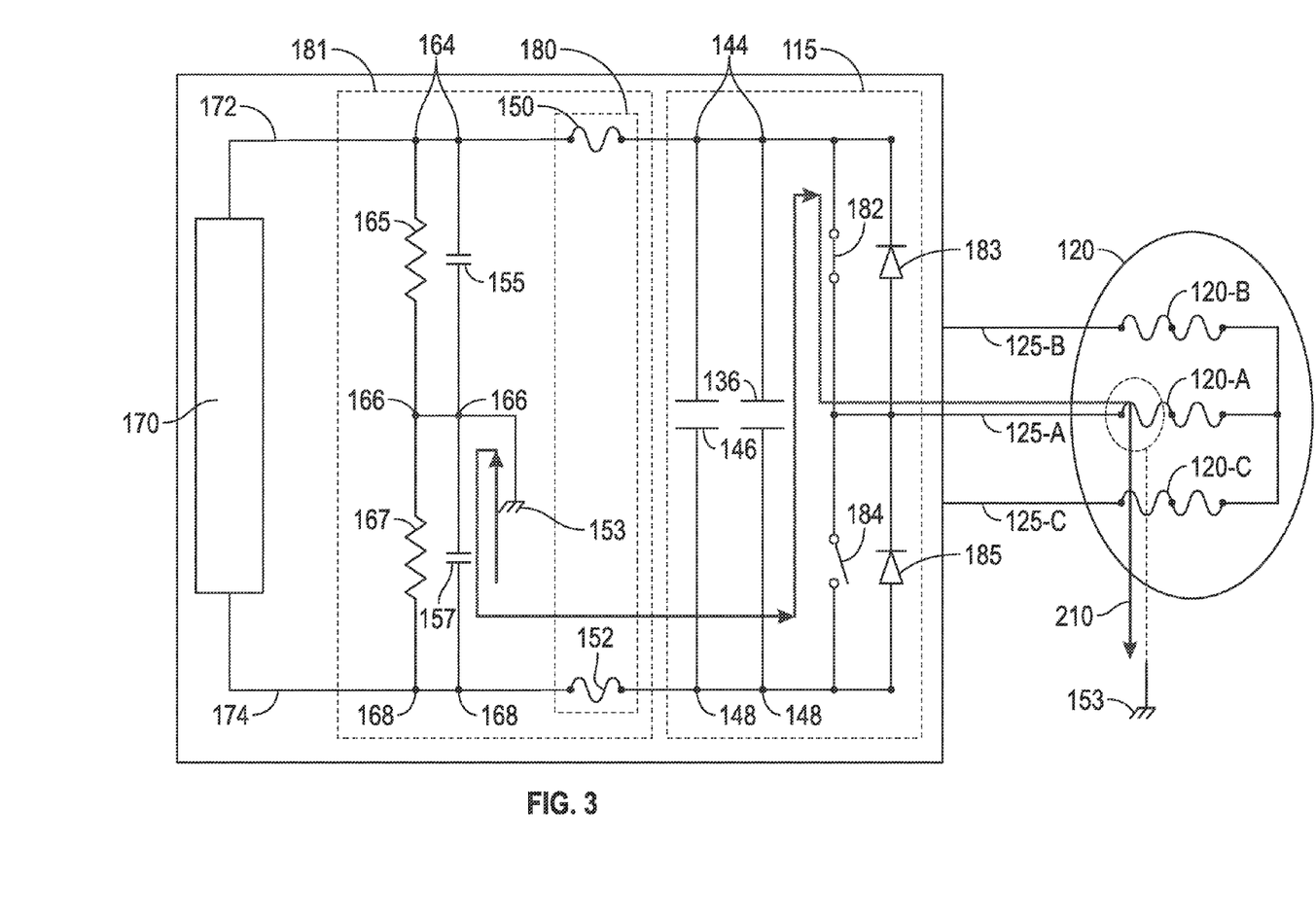
FIGS. 3 and 4 are block diagrams that illustrate the operation of the portion of the machine drive system of FIG. 2 during different AC-to-chassis fault scenarios.
Figure 4:
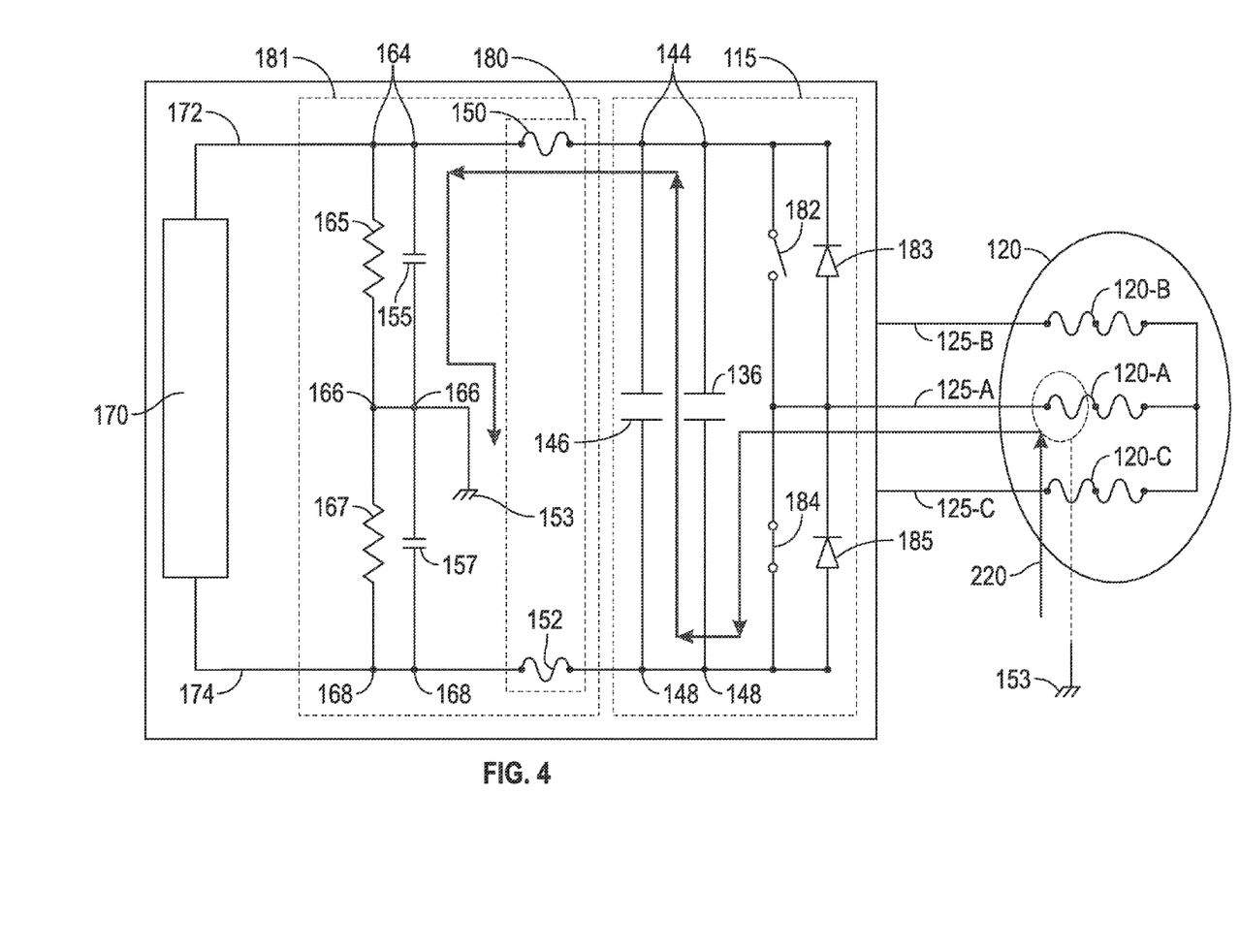

Although FIGS. 2-4 only show a single inverter sub-module 115 from FIG. 1 for sake of brevity, it is noted that additional inverter sub-modules (e.g., inverter sub-modules 117, 119) can be present in other alternative implementations. In addition, the circuitry 181 coupled to inverter sub-module 115 and to each of the additional inverter sub-modules can also include other additional elements that are not illustrated for sake of simplicity.

The portion of the machine drive system 100 that is illustrated in FIGS. 2-4 includes the inverter sub-module 115, machine 120, DC input voltage (Vdc) source 170, a plurality of circuit elements or circuitry 181, and a plurality of nodes 144, 148, 164, 166, 168. In the description that follows, these nodes will be referred to as a first node 144, a second node 148, a third node 164, a fourth node 166, and fifth node 168.

The inverter module (not fully illustrated in FIGS. 2-4) includes an inverter sub-module 115 (for phase A), a bulk capacitor 136 and an X-capacitor 146. It is noted that the inverter module can include other inverter sub-modules (such as inverter sub-modules 117, 119 of FIG. 1 that are not illustrated in FIGS. 2-4). In FIGS. 2-4, the inverter sub-module 115 for phase A is coupled electrically in parallel with bulk capacitor 136 between the first node 144 and the second node 148. The bulk capacitor 136 is coupled electrically in parallel with the X-capacitor 146, which is also coupled between the first node 144 and the second node 148.

The inverter sub-module 115 (for phase A) is coupled to the DC input voltage (Vdc) source 170 by circuitry 181.

The DC input voltage (Vdc) source 170 includes a positive terminal 172 and a negative terminal 174 that are coupled to a high-voltage bus. In one specific implementation that is illustrated, a positive terminal 172 of the DC input voltage (Vdc) source 170 is coupled to the third node 164, and a negative terminal 174 of the DC input voltage (Vdc) source 170 is coupled to the fifth node 168.

The circuitry 181 includes a first Y-capacitor 155, a second Y-capacitor 157, a first isolation resistor 165, a second isolation resistor 167 and fault protection elements 180. Although not illustrated, the circuitry 181 can include additional circuit elements in some implementations.

The disclosed embodiments include fault protection elements 180 coupled to the inverter sub-module 115 to provide a required impedance to limit current magnitude along current paths 210, 220 during an AC-to-chassis fault. In other words, when an AC-to-chassis fault occurs between an AC connection and the chassis 153, fault protection elements 180 are configured to provide inductive impedance that limits the magnitude of the fault current that flows through either the first current path 210 or the second current path 220.

In the embodiment that is illustrated in FIGS. 2-4, the fault protection elements 180 can include a first inductance 150, and a second inductance 152. In this particular embodiment, the X-capacitor 146 is coupled to the first inductance 150 and to the second inductance 152. Specifically, the X-capacitor 146 is coupled to the first inductance 150 at the first node 144 and to the second inductance 152 at the second node 148. As illustrated, the first inductance 150 coupled between the X-capacitor 146 and the first Y-capacitor 155, and the second inductance 152 coupled between the X-capacitor 146 and the second Y-capacitor 157. In this particular implementation, the first inductance 150 is coupled between the first node 144 and the third node 164, and the second inductance 152 is coupled between the second node 148 and the fifth node 168. The first inductance 150 and second inductance 152 have substantially the same inductance. In one implementation, the first inductance 150, and the second inductance 152 have an inductance of about 1.0 to 10.0 microhenries. The first inductance 150 and the second inductance 152 can be implemented using any known inductance that can limit the fault current including, for example, (1) leakage inductance of a common mode choke, (2) stray inductance of the bus that is coupled to the positive terminal 172 and the negative terminal 174 of the DC input voltage (Vdc) source 170, (3) actual inductors, (4) others inductive elements, etc.

As will be explained below, the first inductance 150 and second inductance 152 can provide impedance at high frequencies (e.g., at switching frequencies and higher), to limit the magnitude of the fault current during an AC-to-chassis fault. Placing the first Y-capacitor 155, the second Y-capacitor 157, first isolation resistor 165, and the second isolation resistor 167, on the left side of the first inductance 150 and second inductance 152, or in other words between the first inductance 150, second inductance 152 and the DC input voltage (Vdc) source 170, allows for the first inductance 150 and the second inductance 152 to provide the needed impedance at high frequencies to block the fault current path during a fault. In addition, the first inductance 150 and second inductance 152 can also stabilize the system and reduce the needed DC capacitance, and can also provide filtering of differential mode voltage spikes that are caused due to switching.

The first Y-capacitor 155 and the second Y-capacitor 157 are provided to suppress EMI/EMC noise due to, for example, switching of the first and second switches. The first Y-capacitor 155 is coupled electrically in parallel with the first isolation resistor 165. In the implementation that is illustrated, the first Y-capacitor 155 and the first isolation resistor 165 can be coupled between the chassis 153 and the third node 164 that is shared between the positive terminal 172 of the DC input voltage (Vdc) source 170 and the first inductance 150. The second Y-capacitor 157 is coupled electrically in parallel with the second isolation resistor 167 that is also coupled between the fourth node 166 and the fifth node 168. In the implementation that is illustrated, the second Y-capacitor 157 and the second isolation resistor 167 can be coupled between the chassis 153 and the fifth node 168 that is shared between the negative terminal 174 of the DC input voltage (Vdc) source 170 and the second inductance 152. Thus, in this particular implementation, the first Y-capacitor 155 is coupled between the third node 164 and the fourth node 166, and the second Y-capacitor 157 is coupled electrically in series with the first Y-capacitor 155 between the fourth node 166 and the fifth node 168.

The first isolation resistor 165 is coupled to the positive terminal 172 and in parallel with the first Y-capacitor 155, and the second isolation resistor 167 is coupled to the negative terminal 174 and in parallel with the second Y-capacitor 157. In one specific implementation that is illustrated, the first isolation resistor 165 is coupled between the third node 164 and the fourth node 166, and the second isolation resistor 167 is coupled between the fourth node 166 and the fifth node 168 and electrically in series with the first isolation resistor 165. The isolation resistors 165, 167 provide high-impedance isolated from chassis. Therefore the HEV can tolerate single-fault conditions without immediately shutting down during operation.

The first isolation resistor 165 and second isolation resistor 167 from the chassis 153 limit the magnitude of the fault current at low frequencies, for example, harmonics of the fundamental electrical frequency of the machine and below. The fourth node 166 is coupled to chassis 153 (that is at ground potential).

Operation of Fault Protection Elements During Fault

As mentioned above, by providing first inductance 150 on the positive terminal 172 of the DC input voltage (Vdc) source 170, and the second inductance 152 on the negative terminal 174 of the DC input voltage (Vdc) source 170, during a fault condition, fault currents can be limited. The fault currents that are generated during an AC-to-chassis fault can take two different paths 210, 220 through the fault protection elements 180 that depends on which one of the switches 182, 184 is closed or "on." Stated differently, the fault current can flow through the fault protection elements 180 in different ways depending on which one of the switches 182, 184 is on at any particular time.

To provide an explanation of how the fault protection elements 180 operate under different fault conditions that can occur, an example will now be described with respect to FIGS. 3 and 4.

As illustrated in FIG. 3, in one scenario, when the first (upper) switch 182 (of the inverter sub-module 115) is in the on position (i.e., closed) and an AC-to-chassis fault occurs between the AC connection and the chassis 153, fault current will flow through or along a first current path 210 to the chassis 153 (ground). More specifically, the fault current will flow from the chassis 153 through the fourth node 166, through the second Y-capacitor 157, through the fifth node 168, through second inductance 152, through the fourth node 148, through the bulk capacitor 136, through the first node 144, through the switch 182, and out through the machine winding 120A (or phase A of the three-phase AC machine 120) and into the chassis 153 (ground). In this scenario, the second inductance 152 provides inductive impedance that limits the magnitude of the current generated during the AC-to-chassis fault at high frequencies and the second isolation resistor 167 provides impedance that limits the magnitude of the current generated during the AC-to-chassis fault at low frequencies.

As illustrated in FIG. 4, in another scenario, when the second (lower) switch 184 is in the on position (i.e., closed) and an AC-to-chassis fault occurs between the AC connection and the chassis, fault current will flow through a second current path 220 to the chassis 153 (ground). More specifically, the fault current will flow from the chassis 153 through the machine winding 120A (phase A of the three-phase AC machine 120) through switch 184 through the second node 148 through bulk capacitor 136 through first node 144 through the first inductance 150 through the third node 164 through first Y-capacitor 155 and through the fourth node 166 back to the chassis 153 (ground). In this scenario, the first inductance 150 provides inductive impedance that limits the magnitude of the current generated during the AC-to-chassis fault at high frequencies, and the first isolation resistor 165 provides impedance that limits the magnitude of the current generated during the AC-to-chassis fault at low frequencies.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the embodiments or claims does not imply that process steps must be performed in a temporal or logical order according to such sequence unless it is specifically defined by the language of the claim.

As used herein, the term "alternating current (AC) machine" generally refers to "a device or apparatus that converts electrical energy to mechanical energy or vice versa." An AC machine is an electric machine that is driven by an alternating current. AC machines can generally include synchronous AC machines that include permanent magnet machines. Permanent magnet machines include surface mount permanent magnet machines (SMPMMs) and interior permanent magnet machines (IPMMs).

Although an AC machine can be an AC motor (e.g., apparatus used to convert AC electrical energy power at its input to produce to mechanical energy or power), an AC machine is not limited to being an AC motor, but can also encompass generators that are used to convert mechanical energy or power at its prime mover into electrical AC energy or power at its output. Any of the machines can be an AC motor or an AC generator.

As used herein, the term "vehicle" broadly refers to a non-living transport mechanism having an AC machine. In addition, the term "vehicle" is not limited by any specific propulsion technology such as gasoline or diesel fuel. Rather, vehicles also include hybrid vehicles, battery electric vehicles, hydrogen vehicles, and vehicles which operate using various other alternative fuels.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A system, comprising:
   a ground node that is at ground potential;
   an inverter module comprising: an inverter sub-module coupled to an AC connection;
   a first current path over the AC connection from the ground node through the inverter sub-module;
   a second current path over the AC connection from the ground node through the inverter sub-module; and
   fault protection elements coupled to the inverter sub-module, wherein the fault protection elements are configured to provide inductive impedance that limits the magnitude of a current that flows through either the first current path or the second current path when an AC-to-ground fault occurs between the AC connection and the ground node.

2. A system according to claim 1, wherein the inverter module further comprises: an X-capacitor coupled electrically in parallel with the inverter sub-module, and further comprising:
   a first Y-capacitor; and
   a second Y-capacitor coupled electrically in series with the first Y-capacitor, wherein the fault protection elements are coupled between the inverter sub-module, the first Y-capacitor, and the second Y-capacitor,
   wherein the AC-to-ground fault protection elements, comprise:
   a first inductance coupled between the X-capacitor and the first Y-capacitor, and
   a second inductance coupled between the X-capacitor and the second Y-capacitor.

3. A system according to claim 2, further comprising:
   a high-voltage bus;
   a voltage source having a positive terminal and a negative terminal coupled to the high-voltage bus;
   a first isolation resistor that is coupled to the positive terminal and electrically in parallel with the first Y-capacitor;
   a second isolation resistor that is coupled to the negative terminal and electrically in parallel with the second Y-capacitor.

4. A system according to claim 3, wherein the first Y-capacitor and the first isolation resistor are coupled between the ground node and a node that is shared between the positive terminal of the voltage source and the first inductance, and wherein the second Y-capacitor and the second isolation resistor are coupled between the ground node and another node that is shared between the negative terminal of the voltage source and the second inductance.

5. A system according to claim 4, further comprising:
an electric machine comprising a winding, wherein the inverter sub-module is coupled to the winding via the AC connection,
wherein the inverter sub-module comprises a first switch and a second switch, wherein the current flows along the first current path when the first switch is closed, wherein the first current path is from the ground node through the second inductance, the inverter sub-module, the first switch, the winding, and back to the ground node, wherein the second inductance provides inductive impedance that limits the magnitude of the current generated during the AC-to-ground fault at high frequencies when the first switch is closed, wherein the second Y-capacitor that is designed to suppress EMI noise due to switching of the first and second switches, and wherein the second isolation resistor provides another impedance that limits the magnitude of the current generated during the AC-to-ground fault at low frequencies when the first switch is closed.

6. A system according to claim 5, wherein the current flows along the second current path when the second switch is closed, wherein second current path is from the ground node through the winding, the inverter sub-module, the first inductance and back to the ground node, wherein the first inductance provides inductive impedance that limits the magnitude of the current generated during the AC-to-ground fault at high frequencies when second switch is closed, wherein the first Y-capacitor is designed to suppress EMI noise due to switching of the first and second switches, and wherein the first isolation resistor provides another impedance that limits the magnitude of the current generated during the AC-to-ground fault at low frequencies when the second switch is closed.

7. A system according to claim 2, wherein the inverter module further comprises:
a bulk capacitor coupled electrically in parallel with the inverter sub-module and the X-capacitor.

8. A hybrid electric vehicle having a chassis that is at ground potential, the hybrid electric vehicle comprising:
an electric machine comprising a winding;
an inverter module comprising: an inverter sub-module coupled to the winding via an AC connection; and
fault protection elements coupled to the inverter sub-module, wherein the fault protection elements are configured to provide inductive impedance that limits the magnitude of a current that flows through either a first current path or a second current path when an AC-to-chassis fault occurs between the AC connection and the chassis.

9. A hybrid electric vehicle according to claim 8, further comprising:
a first Y-capacitor; and
a second Y-capacitor coupled electrically in series with the first Y-capacitor, wherein the Fault protection elements are coupled between the inverter sub-module, the first Y-capacitor, and the second Y-capacitor.

10. A hybrid electric vehicle according to claim 9, wherein the inverter module further comprises: an X-capacitor coupled electrically in parallel with the inverter sub-module, and wherein the fault protection elements, comprise:
a first inductance coupled between the X-capacitor and the first Y-capacitor, and
a second inductance coupled between the X-capacitor and the second Y-capacitor.

11. A hybrid electric vehicle according to claim 10, further comprising:
a high-voltage bus;
a voltage source having a positive terminal and a negative terminal coupled to the high-voltage bus;
a first isolation resistor that is coupled to the positive terminal and electrically in parallel with the first Y-capacitor;
a second isolation resistor that is coupled to the negative terminal and electrically in parallel with the second Y-capacitor.

12. A hybrid electric vehicle according to claim 11, wherein the first Y-capacitor and the first isolation resistor are coupled between the chassis and a node that is shared between the positive terminal of the voltage source and the first inductance, and
wherein the second Y-capacitor and the second isolation resistor are coupled between the chassis and another node that is shared between the negative terminal of the voltage source and the second inductance.

13. A hybrid electric vehicle according to claim 12, wherein the inverter sub-module comprises a first switch and a second switch, wherein the current flows along the first current path when the first switch is closed, wherein the first current path is from the chassis through the second inductance, the inverter sub-module, the first switch, the winding, and back to the chassis.

14. A hybrid electric vehicle according to claim 13, wherein the current flows along the second current path when the second switch is closed, wherein second current path is from the chassis through the winding, the inverter sub-module, the first inductance and back to the chassis.

15. A hybrid electric vehicle according to claim 13, wherein the first inductance provides inductive impedance that limits the magnitude of the current generated during the AC-to-chassis fault at high frequencies when second switch is closed, wherein the first Y-capacitor is designed to suppress EMI noise due to switching of the first and second switches, and wherein the first isolation resistor provides another impedance that limits the magnitude of the current generated during the AC-to-chassis fault at low frequencies when the second switch is closed.

16. A hybrid electric vehicle according to claim 15, wherein the second inductance provides inductive impedance that limits the magnitude of the current generated during the AC-to-chassis fault at high frequencies when the first switch is closed, wherein the second Y-capacitor that is designed to suppress EMI noise due to switching of the first and second switches, and wherein the second isolation resistor provides another impedance that limits the magnitude of the current generated during the AC-to-chassis fault at low frequencies when the first switch is closed.

17. A hybrid electric vehicle according to claim 13, wherein the inverter module further comprises: a bulk capacitor coupled electrically in parallel with the inverter sub-module and the X-capacitor, and further comprising:
a first node;
a second node, wherein the bulk capacitor and the X-capacitor are coupled between the first node and the second node, and wherein the X-capacitor is coupled to the first inductance at the first node and to the second inductance at the second node;
a third node coupled to the positive terminal of the voltage source, wherein the first inductance is coupled between the first node and the third node;
a fourth node coupled to the chassis, wherein the first Y-capacitor and the first isolation resistor are coupled between the third node and the fourth node, and wherein the second isolation resistor is coupled electrically in series with the first isolation resistor at the fourth node; and a fifth node coupled to the negative terminal of the voltage source, wherein the second inductance is coupled between the second node and the fifth node, wherein the second Y-capacitor and the second isolation resistor are coupled between the fourth node and the fifth node.

18. A hybrid electric vehicle according to claim 17, wherein the first current path is from the chassis through the fourth node, through the second Y-capacitor, through the fifth node, through second inductance, through the fourth node, through the bulk capacitor, through the first node, through the first switch, and out through the winding into the chassis.

19. A hybrid electric vehicle according to claim 18, wherein the second current path is from the chassis through the winding, through second switch, through the second node, through bulk capacitor, through first node, through the first inductance, through the third node, through first Y-capacitor, and through the fourth node into the chassis.

20. In a hybrid electric vehicle comprising an electric machine comprising a winding, an inverter sub-module coupled to the winding via an AC connection, the inverter sub-module comprising a first switch and a second switch, first and second inductances, coupled to the inverter sub-module, and a chassis that is at ground potential, a fault protection method for limiting the magnitude of a current that flows when an AC-to-chassis fault occurs between the AC connection and the chassis, the method comprising the steps of:

when the first switch is closed, passing the current along a first current path from the chassis through the second inductance to limit the magnitude of the current generated during the AC-to-chassis fault; and when the second switch is closed, passing the current along a second current path from the chassis through the first inductance and back to the chassis, wherein the first inductance limits the magnitude of the current generated during the AC-to-chassis fault.

* * * * *